Feb. 18, 1941. J. HAMMERL 2,232,386
MOTOR VEHICLE
Filed June 20, 1938
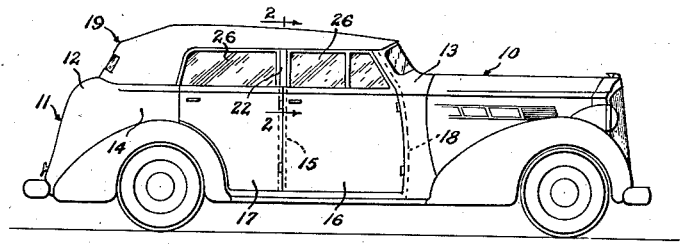
Fig. 1.
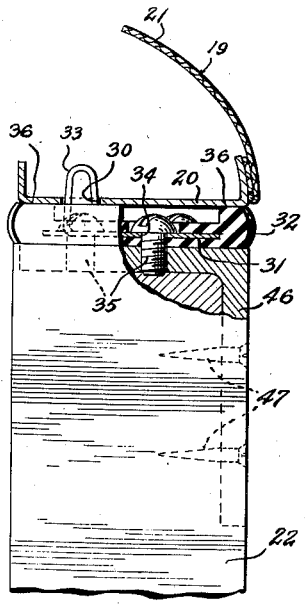
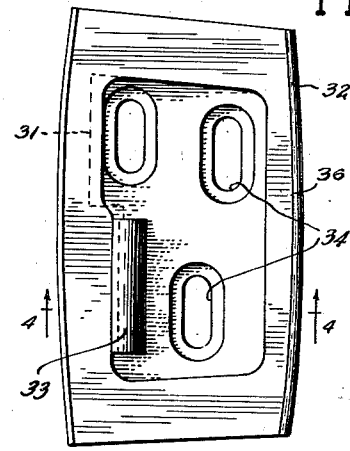
Fig. 3.
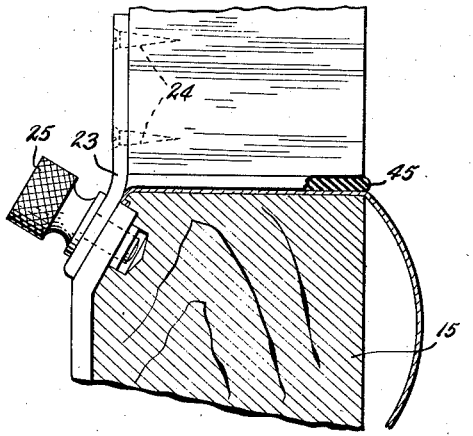
Fig. 2.
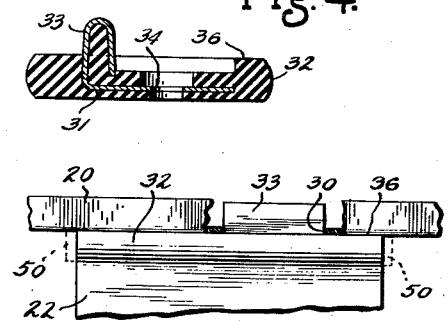
Fig. 4.
Fig. 5.
INVENTOR
Jacob Hammerl
BY Tibbetts & Hart
ATTORNEYS Patented Feb. 18, 1941

2,232,386

UNITED STATES PATENT OFFICE 2,232,386

MOTOR VEHICLE

Jacob Hammerl, Detroit, Mich., assignor to Packard Motor Car Company, Detroit, Mich., a corporation of Michigan Application June 20, 1938, Serial No. 214,641

2 Claims. (Cl. 296—121)

This invention relates to motor vehicles and more particularly to motor vehicles of the convertible sedan type.

In production manufacture of convertible sedan motor vehicles, it has been the usual practice to assemble the chassis, the body and the top structure frame separately and to fit them together on the final assembly line, the fabric covering for the top structure being fitted and secured to the top frame as the final operation. The collapsible top frame is first fixed at its rear end to the body and at the same time center pillar extensions are fixed to the body in relation to fit with the adjacent edges of the door windows. The top frame is formed or provided with anchoring means for cooperation with anchoring means fixed on the center pillar extensions and the windshield frame, and such anchoring means is engaged prior to fitting of the fabric cover.

Because of unavoidable manufacturing inaccuracies and the shifting of the anchoring means on the center pillar extensions caused by their adjustment to fit with the door windows, the assembly of the top frame has in many cases been a problem. Various compromises in the location of structural elements must be effected that, at best, result in loose fitting windows. Because of the difficulty in obtaining uniform anchorage location with window fit, the production line is slowed up and a considerable extra cost for labor is entailed.

An object of this invention is to provide a convertible sedan body structure with anchoring means that will materially reduce the labor and cost of fitting the top to the body.

Another object of the invention is to lower the cost of manufacturing convertible sedan bodies by a method of assembly that substantially eliminates the necessity for the compromise top and window fitting now required.

Another object of the invention is to provide an anchorage that can be readily shifted for quick and accurate assembly of the top frame with the body of a convertible sedan.

A further object of the invention is to provide a convertible sedan body with anchoring and mounting units that can be quickly applied to the center pillars in adjusted positions to properly engage and support the collapsible top frame when extended.

Other objects of the invention will appear from the following description taken in connection with the drawing, which forms a part of this specification, and in which:

Fig. 1 is a side elevational view of a motor vehicle incorporating the invention;

Fig. 2 is a sectional view taken on line 2—2 of Fig. 1, showing the top anchorage on the center pillar extension;

Fig. 3 is a plan view of the top anchor means on the pillar extension;

Fig. 4 is a sectional view of the top anchor means taken on line 4—4 of Fig. 3;

Fig. 5 is a fragmentary elevational view of the top anchor means in position with the pillar extension and the top.

In the drawing, 10 designates generally a motor vehicle having a convertible sedan type of body 11. The body has the usual rear section 12, cowl and windshield section 13, and side panels 14. Main center pillars, as indicated at 15, are associated with the body sides to form part of the frames for the front and rear doors. The front doors 16 are hinged to the front pillars 18 and the rear doors 17 are hinged to the main center pillars.

The collapsible top structure, indicated generally at 19, is fixed to the rear body section at its rear end and when extended is anchored at its front end to the top of the windshield section of the body. The top structure shown is conventional and includes a foldable frame 20 and a fabric cover 21.

In order to assist in supporting the top structure when extended and to provide a portion of the body frame with which the door windows 26 engage, it is customary to provide center pillar extensions 22. Such extensions have supporting brackets 23 attached thereto by screws 24 and the brackets are secured on the main center pillars by one or more fastening screws 25. Interposed between the bottom of the extension pillars and the main pillars are rubber spacers 45. The brackets have a fixed relation with the center pillars and the extensions can be attached to the brackets in the relation required to properly align with the adjacent edges of the door windows for sealing contact therewith when the doors are closed. Secured by screws 47 to the upper end of the pillar extensions are metal caps 46.

Heretofore the top structure has been provided with anchor means during assembly thereof for cooperation with anchor means on the windshield and cowl unit and on the center pillar extensions. Because of manufacturing inaccuracies, the intermediate anchor means of the top structure and body are often out of cooperating relation and this is mainly so because of the necessity for securing the center pillar extensions in various positions of adjustment for proper alignment with the adjacent edge portions of the door windows. Thus the proper relation of some of the elements forming part of the window openings, when the top structure is extended, will misalign with other elements forming part of the window openings and, as a result, in production manufacturing where the top structure frame is fabricated before application to the body great difficulty has been experienced and extra labor and expediencies are required to passably assemble the tops on the bodies. Further, such extra operations generally obtain only a loose fit of the door windows with the top structure that is never entirely satisfactory.

In order to overcome such production manufacturing difficulties, a top mounting and anchorage is provided that can be quickly positioned in desired relation while the vehicle is on the assembly line. The side members of the frame 20 of the top structure are each punched to provide an anchoring opening 30 and anchoring means is fixed on the tops of the center pillar extensions for projection into the top frame openings. Each of such anchoring means can be a unitary structure having a plate 31 embedded in a rubber mounting block 32, the plate having an upstanding turned back tongue 33 at one edge extending above the rubber block for engaging in a top frame anchoring opening. The plates are formed preferably of metal and have a plurality of openings 34 therethrough that are elongated in a direction longitudinally of the vehicle. The rubber blocks are formed with openings above and below the openings in the plates and the upper of such openings are of larger dimensions than the openings in the plates so that the heads of fastening screws 35 can lie below the upper adjacent surface of the blocks when extended through the openings in the plates to secure the blocks to the caps on the tops of the center pillar extensions. The marginal upper faces 36 of the rubber blocks project above the central portions, through which the openings extend, and serve as mountings or support means on which the sides of the top frame can rest.

When the vehicle is on the assembly line the center pillar extensions are lined up between the front and rear windows and are secured to the main center pillars. An anchoring and mounting unit is placed on the top of each center pillar extension and screws 35 are extended through the opening in the rubber block and plate and are turned into the extension caps so that the heads are below the top of the flange 36 of the blocks. The top structure frame is fixed to the body at its rear end and is extended and anchored at the front end to the windshield frame. The anchoring units are shifted longitudinally so that tongues 33 will align with and project into openings 30 in the top frame after which the top structure is raised and the screws 35 are turned down to securely fix the anchoring means in such adjusted positions. The rubber blocks can be formed larger than the pillar extensions so that their edges can be trimmed to substantially the same shape as the cap brackets on the top of the center pillar extensions when in adjusted positions, such trimmed off portions 50 being shown in dotted lines in Fig. 5. After the top frame is properly anchored the fabric cover 21 is fitted and secured thereto.

With this anchorage for the intermediate portion of the top structure assembly, difficulties ordinarily caused by manufacturing inaccuracies are reduced and manufacturing tolerances do not have to be so strictly observed. The anchorage allows workmen to readily provide a convertible sedan body in which the door windows will have a leak-proof fit.

Although the invention has been described in connection with a specific embodiment, the principles involved are susceptible of numerous other applications which will readily occur to persons skilled in the art. The invention is therefore to be limited only as indicated by the scope of the appended claims.

What is claimed is:

1. A unit adapted to be secured on a convertible sedan body for mounting and anchoring the top frame comprising a rubber mounting block having vertically extending openings therethrough elongated in a direction longitudinally of the body, a metal plate embedded in the block having openings therethrough in line with the block openings, said openings being adapted to receive securing means, and a tongue bent up from the plate extending above the block for anchoring the top frame.

2. An anchoring and mounting unit for the top structure of a convertible body comprising a rubber mounting block of substantially uniform thickness around the edges of the block, and a metal plate embedded in the block and having a tongue extension projecting above the surface of the block for cooperating with the top structure, and means for securing the unit in place, said means being entirely below the upper surface of the unit.

JACOB HAMMERL.